United States Patent [19]

Day et al.

[11] 4,455,521

[45] Jun. 19, 1984

[54] ENERGY SAVER CONTROL FOR SINGLE PHASE MOTORS

[75] Inventors: Alvin L. Day, Ames, Iowa; Howard E. Jordan, Euclid, Ohio

[73] Assignee: Reliance Electric Company, Cleveland, Ohio

[21] Appl. No.: 272,915

[22] Filed: Jun. 12, 1981

[51] Int. Cl.³ .............................................. H02P 7/36
[52] U.S. Cl. .................................... 318/798; 318/812; 318/786
[58] Field of Search .............. 318/781, 785, 786, 789, 318/790, 800, 802, 805, 816, 812, 798, 331-332, 345 D, 345 H, 339, 393, 433, 797, 341, 787; 324/158 MG, 140 D; 328/161

[56] References Cited

U.S. PATENT DOCUMENTS

| | | | |
|---|---|---|---|
| 3,441,823 | 4/1969 | Schlabach | 318/809 |
| 3,855,509 | 12/1974 | Wright | 318/812 |
| 4,041,395 | 8/1977 | Hill | 324/140 D X |
| 4,091,662 | 5/1978 | Emanuel | 324/158 MG X |
| 4,162,435 | 7/1979 | Wright | 318/138 |
| 4,176,307 | 11/1979 | Parker | 318/812 X |
| 4,238,717 | 12/1980 | Knight et al. | 318/341 |
| 4,378,520 | 3/1983 | Ford | 318/790 |

OTHER PUBLICATIONS

"Power Factor Controller"; NASA; George C. Marshall Flight Center, Marshall Space Flight Center, Alabama; Apr. 2, 1979; pp. 11-13.

Primary Examiner—G. Z. Rubinson
Assistant Examiner—Patrick Keane
Attorney, Agent, or Firm—Ronald R. Stanley

[57] ABSTRACT

A circuit is disclosed for controlling operation of a single phase electric motor to obtain maximum efficiency over a complete range of load conditions for the motor. Under conditions of less than full load, single phase motors waste electricity when full AC power is continuously supplied thereto. At less than full load, the torque requirements of a motor are reduced and therefore the flux can be reduced, thus increasing the efficiency. An electrical switch, in electrical series with the motor, is used to control the motor flux by reducing the "on time" of the switch and thereby decreasing the voltage applied to the motor. The ratio of auxiliary winding voltage to main winding voltage is the parameter used in the instant invention to provide a measure of the load condition of the motor and thus operate the electrical switch.

16 Claims, 7 Drawing Figures

ENERGY SAVER CONTROL FOR SINGLE PHASE MOTORS

BACKGROUND OF THE INVENTION

The present invention relates to an improvement in controls for single phase motors and, more particularly, to circuitry for reducing the flux in a single phase motor during light load operation to thereby reduce losses and increase efficiency of the motor.

Many electrical motors perform at less than their rated loads during a majority of the time they are energized. Efficiency of an electric motor declines with load and therefore an increasing proportion of the electrical energy delivered to a motor under reduced load is wasted. Since single phase motors comprise a substantial part of the total electric motor population, it is therefore desirable to reduce the energy lost during light load operation of these motors.

It has been recognized before that under reduced load conditions the magnetic flux in a single phase motor can be reduced because the torque requirements necessary to sustain the load are also reduced. A significant portion of the total losses in a single phase motor is due to losses occurring in the motor core. By reducing the flux at light loads, the losses in the motor core are also reduced thereby improving the light load efficiency of the motor. Reduction in flux also provides improvement in motor efficiency by reducing the magnetizing component of the current and thereby also reducing the $i^2R$ losses of the motor. As a result, the efficiency of a motor can be increased by controlling the flux in a single phase motor during light load conditions.

One well known and convenient means for controlling the flux of a motor is accomplished by inserting a triac, or equivalent switching device, in series with the motor. By reducing the "on time" of the switching device as the load decreases, the effective value of the voltage applied to the motor and therefore the flux may be reduced thereby increasing motor efficiency. In order that "on time" of the switching device be controlled as a function of the load, it was considered necessary that the load be directly measured by a separate sensing device. The use of such a sensing device, however, adds more expense and complexity than can be justified for most applications where single phase motors are used, even when compared to the energy saved. As an example, rotor speed is a good indicator of the load on a single phase motor. A control circuit would need simply to maintain a constant RPM as the load varies. For this type of control, a tachometer is required in order to sense the speed.

Other methods of increasing efficiency of single phase motors include power factor control, wherein a constant power factor is attempted to be maintained as the load varies. If the power factor can be maintained, the motor would be operating near its maximum efficiency. The power factor, however, is not monotonic as a function of voltage. Further, for rapid changes in load, it is possible that the circuitry cannot respond fast enough to prevent the power factor from exceeding the maximum value and driving the motor voltage in the wrong direction.

While it was recognized at this time that it would be far more desirable to control the "on time" of the switching device by a parameter which is an indicator of load but does not require the use of separate load sensing devices, no such technique was known.

SUMMARY OF THE INVENTION

In accordance with the present invention, there is provided circuitry which allows the "on time" of a switching device to be controlled by a parameter which is a measure of load. Most single phase motors are equipped with a second stator winding, commonly called an auxiliary or starter winding, which is placed in space quadrature to a main stator winding.

The parameter to be used in controlling switching device "on time" is the ratio of the auxiliary winding voltage to the main winding voltage. This ratio continually decreases as the load increases and thereby results in a measure of the load, without separate load sensing circuitry. The motor can be made to operate near its maximum efficiency, that is minimum loss, by maintaining a constant ratio of auxiliary winding voltage to main winding voltage. The value of this ratio does not drop below the full load value as the line voltage varies, as long as the line voltage does not exceed approximately 10% above rated value. As noted above, the characteristic used to control the "on time" should preferably be monotonic as a function of voltage. The ratio of auxiliary winding voltage to main winding voltage is effectively monotonic. Thus, the ratio of auxiliary winding voltage to main winding voltage may be used to control a switching device "on time" and thereby reduce losses during light load operation of a single phase motor.

DETAILED DESCRIPTION OF THE PREFERRED EMBODIMENTS

Figure 1:
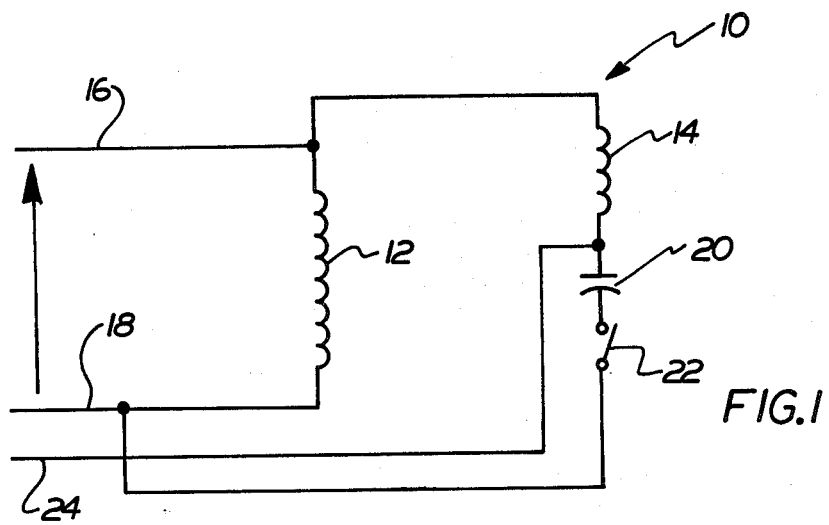
FIG. 1 is an electrical schematic representation of a single phase electric motor.

An equivalent motor circuit 10 for a single phase induction motor illustrated in FIG. 1 includes a main winding 12 and an auxiliary or starting winding 14. The motor is energized from an alternating current, AC, source through first and second AC input terminals 16 and 18. Main winding 12 is connected directly to the input terminals while auxiliary winding 14 is connected to the AC power through a capacitor 20 and switch 22 arranged as a start-up circuit for the motor. An auxiliary terminal 24 extends from a point between the auxiliary winding and capacitor 20 for a purpose to be explained further hereinbelow.

The basis of the present invention resides in the fact that once an electric motor has been started, full load use is encountered during operation of the motor relatively infrequently. Rather, during a large portion of the time that the motor is operated, the load on the motor is less than full load. Any time that an electric motor is not operating at full load, some portion of the electrical energy delivered to the windings of the motor is wasted. If, under conditions of less than full load, the amount of energy delivered to the electric motor were reduced to a level necessary to sustain operation of the motor in view of the portion of the load, the motor could be made to operate considerably more efficiently.

Figure 2:
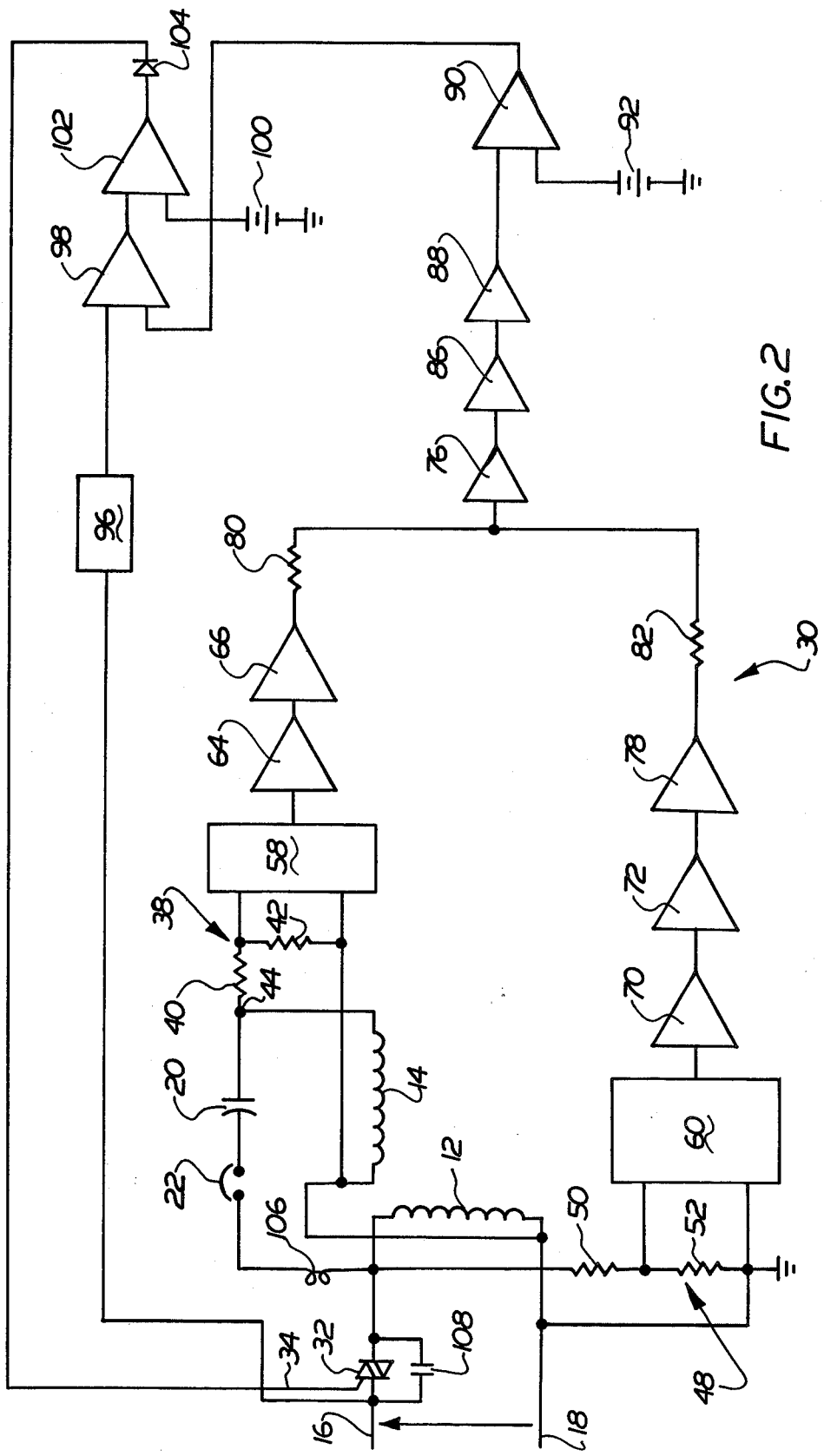
FIG. 2 is an electrical schematic illustrating a control circuit according to a preferred embodiment of the invention.

FIG. 2 illustrates a control circuit 30 for controlling the amount of energy delivered to the windings of the motor wherein the energy is dependent on the load under which the motor is operating. In order to control the amount of electrical energy delivered to the windings 12 and 14 of the motor, a bidirectional electrical switch 32 is provided in-line with the motor, between input terminal 16 and one end of main winding 12. The bidirectional electrical switch can be any of a number of well known solid state switching devices such as a triac but must have a current rating commensurate with the intended ratings of the motor. The operation of switch or triac 32 is such that electrical energy is delivered to the windings of the motor when a gate 34 of the switch has an appropriate control signal present thereat. As noted above, the present invention is intended to provide such a control signal through utilization of a measurement which does not require additional sensing circuitry and hardware in order to provide information related to the loading of the electrical motor.

The ratio of electrical voltage applied to auxiliary winding 14 to the electrical voltage supplied to main winding 12 provides an accurate relationship relative to the loading of the electrical motor, as noted above. Control circuit 30 enables this ratio to be calculated without additional sensing mechanisms. The ratio is used to provide a signal for gate 34 which controls the electrical energy delivered to the motor. A voltage dividing network 38, consisting of resistors 40 and 42, is arranged in parallel circuit connection with auxiliary winding 14. The voltage across resistor 42 is therefore proportional to the voltage appearing across the auxiliary winding. Point 44 at which resistor 40 connects the voltage divider to auxiliary winding 14 is equivalent to auxiliary terminal 24 shown in FIG. 1 above. Likewise, a voltage divider network 48, including resistors 50 and 52, is arranged relative to main winding 12 of the motor such that the voltage appearing across resistor 52 is proportional to the voltage applied to main winding 12. Since the voltages applied to the motor and thus windings 12 and 14 are AC signals, the respective voltages across resistors 42 and 52 are likewise AC signals. In order to use the voltages appearing across resistors 42 and 52 in the circuitry required to provide a signal for gate 34, each of these voltages is converted to a DC signal through fullwave bridges 58 and 60, connected across the resistors, respectively.

The outputs of bridges 58 and 60 are therefore DC electrical signals proportional to the voltages across the auxiliary winding and main winding, respectively. To obtain the ratio of the voltage across the auxiliary winding to the voltage across the main winding, the output of bridge 58 must be divided by the output of bridge 60. Mathematical division can be provided, in a known manner, through the use of logarithms and a simple summing process. To this end, the output of bridge 58 is connected to a signal amplifier 64 and in turn to a logarithmic amplifier 66. Assuming the gain of signal amplifier 64 to be a constant A, the electrical output of logarithmic amplifier 66 is then equivalent to the log (A $V_A$). In like fashion, the output of bridge 60 is electrically connected to a signal amplifier 70 and in turn to the logarithmic amplifier 72. The output of logarithmic amplifier 72 is therefore equal to the log (A $V_M$), assuming the gain of amplifier 72 to be A.

Division of $V_A$ by $V_M$ is equivalent to the antilogarithm of log $V_A$ minus log $V_M$. The outputs of logarithmic amplifiers 66 and 72 are combined through a summing amplifier 76 after the output of logarithmic amplifier 72 has been inverted by the actions of an inverting amplifier 78. Resistors 80 and 82 are provided between the outputs of amplifiers 66 and 78 to cooperate with summing amplifier 76 in providing the summing action. The output of amplifier 76 is then electrically connected to an antilogarithmic amplifier 86.

Control of the voltage applied to the windings of the motor has been determined to provide efficient operation of the motor when the ratio of auxiliary winding voltage to main winding voltage is maintained very near a predetermined value. An error signal, that is, the extent by which the actual ratio of auxiliary winding voltage to main winding voltage varies from this predetermined value, is determined by subtracting the actual ratio from the predetermined value. In order to accomplish this comparison, the output of antilog amplifier 86 is connected to a unity gain inverting amplifier 88. The output of this inverting amplifier is connected to one input of a summing amplifier 90 while another input of the summing amplifier is connected to a reference voltage 92 providing a value equivalent to the predetermined value of the ratio. The output of summing amplifier 90 is therefore a signal which indicates the extent, if any, by which the actual ratio of auxiliary winding voltage to main winding voltage varies from the predetermined value.

Figure 3A:
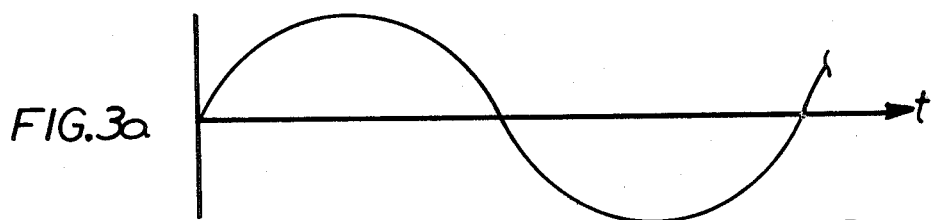
FIGS. 3a, 3b, and 3c illustrate electrical waveforms of signals at specific points within the circuit shown in FIG. 2.
Figure 3B:
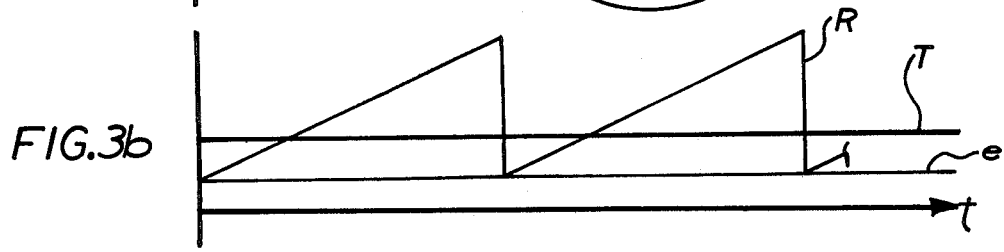

A ramp generator 96 is powered by and therefore synchronized with the unregulated 60 cycle AC input to the motor. The input of ramp generator 96, connected at input terminal 16, has an input signal which reoccurs every 60 cycles. FIG. 3A illustrates the AC signal supplied at input terminals 16 and 18. Ramp generator 96 has an output as indicated at "R" in FIG. 3B. The error signal, indicated at "e" is also shown in FIG. 3B. Ramp signal "R" and error signal "e" are combined through a summing amplifier 98 to provide the composite signal shown in FIG. 3B, wherein the ramp signal is referenced from the zero base line by the value of the error signal.

Figure 3C:
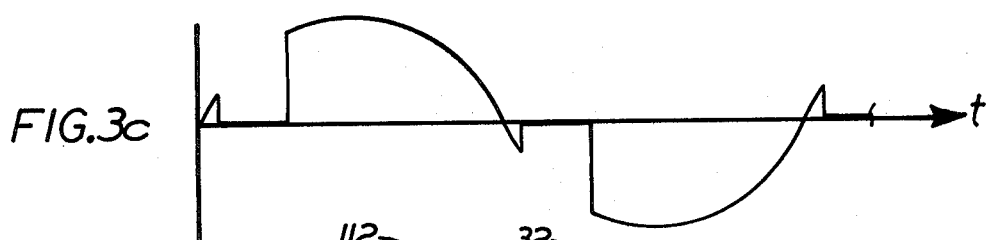

In order to provide a signal for the gate of triac 32, the output of amplifier 98 is compared to a threshold T voltage level 100 by a comparator 102. Diode 104, at the output of comparator 102, connects the output signal, shown in FIG. 3B, to gate 34 of the triac. The output signal of comparator 102 is phase advanced or retarded each successive half cycle of the AC line voltage depending upon the magnitude of the error signal e. For example, as the error signal e increases, gate signal 34, to the triac, is phase advanced so that the triac is in conduction over a larger portion of each half cycle. Diode 104 insures that undesirable AC signal portions do not enter the logic circuitry and cause damage thereto. FIG. 3C indicates the resultant voltage applied to main winding 12 of the motor due to gating of triac 32 by control circuit 30. A comparison of FIGS. 3A and 3C shows that the amount of energy supplied to the motor by the efforts of control circuit 30 is less than the amount which would normally be applied to the motor. The energy supplied to the motor under the control of the circuit of the present invention changes as a function of the error signal, output of amplifier 90, and thus loading of the motor.

As noted above, capacitor 20 and switch 22 are intended for starting of the motor. Generally, the electric motor requires full power be delivered to both main winding 12 and auxiliary winding 14 in order for the motor to achieve full speed operation under whatever loading conditions are required. For this reason, control circuit 30 is desired to be ineffectual during start-up of the electric motor. Bypass of the control circuit is accomplished by insertion of a current sensing relay 106 within the secondary winding circuit. A normally opened contact 108 associated with current sensing relay 106 is provided across triac 32 to short out the triac when relay 106 is energized. During start-up of the motor, relay 106 is energized immediately upon the application of AC power to input terminals 16 and 18. Once the electrical motor has started in typical fashion, switch 22 opens thus deenergizing relay 106 and opening contact 108 to allow operation of the motor under the control of circuit 30.

Figure 4:
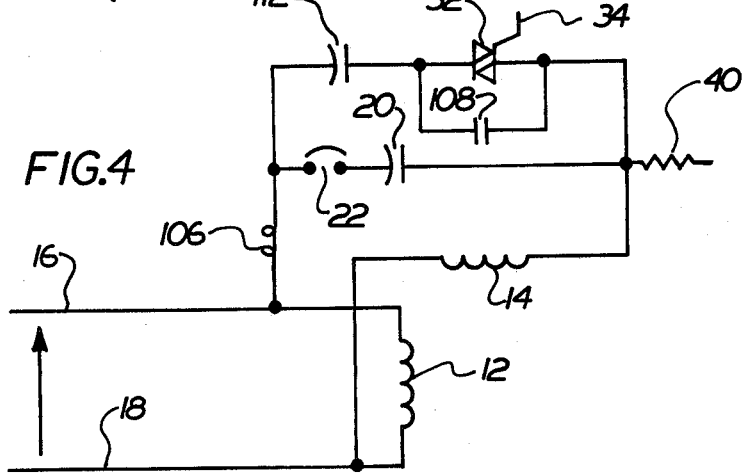
FIG. 4 is an electrical schematic illustrating an alternate embodiment of a portion of the control circuit shown in FIG. 2; and, FIG. 5 is an electrical schematic illustrating another embodiment of a control circuit for the single phase electric motor.

FIG. 4 illustrates an arrangement of control circuit 30 wherein triac 32 is located in the auxiliary winding branch of the motor circuit. Operation of the circuit is identical to that explained above with regard to FIG. 2. The triac is arranged in electrical parallel connection with starting capacitor 20 and starting switch 22 across secondary winding 14 of the motor. A capacitor 112 is connected in electrical series with triac 32 as a run capacitor and maintains operation of the motor after auxiliary switch 22 has opened subsequent to start-up of the motor.

Despite the fact that auxiliary winding 14 is disconnected from the AC power after the motor has started and switch 22 opens, a voltage is induced onto the auxiliary winding by the magnetic field of the rotating motor. This induced voltage is sensed by the control circuit. The electrical circuit arrangement of triac 32 in FIG. 4 results in the triac being in parallel with capacitor 20 and in series with auxiliary winding 14. The arrangement of the motor windings causes a quasi two-phase operation of the motor. As a result, the ratio of main winding voltage to auxiliary winding voltage is controlled by manipulating the auxiliary winding voltage only.

Figure 5:
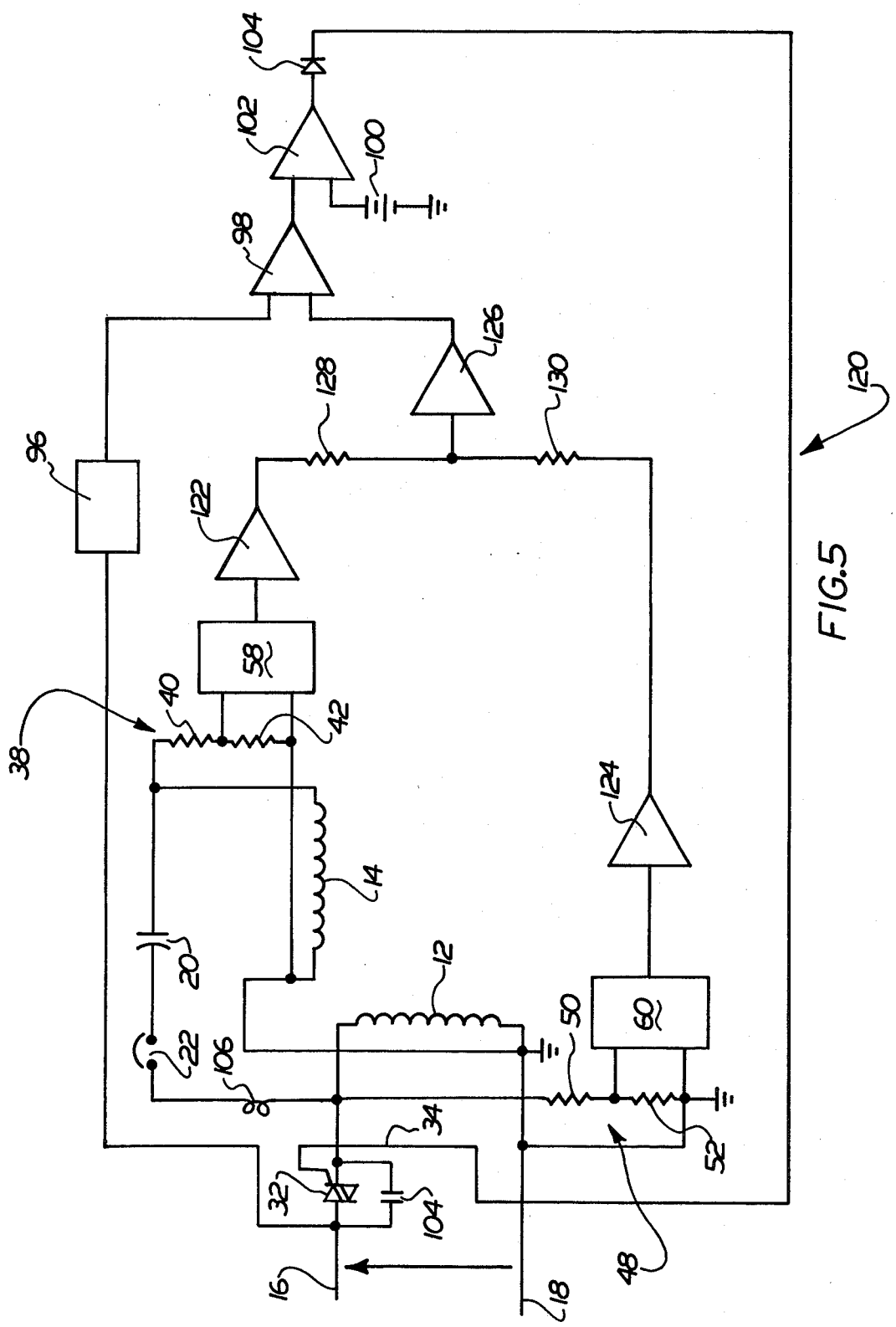

The circuit shown in FIG. 5 is an alternate embodiment of the motor control circuit shown in FIG. 2. In the discussion above, it was noted that in order to calculate the ratio of auxiliary winding voltage to main winding voltage, logarithmic functions were used to enable the logs of each of the voltage values to be subtracted one from another, with the antilog then being taken to arrive at the division of the two values. A close approximation of the actual ratio may be obtained by simply subtracting the value of the auxiliary winding voltage from the value of the main winding voltage without the use of logarithms.

A control circuit 120, shown in FIG. 5, illustrates an alternate embodiment of the present invention using this approximation of the ratio. While the result in control of the motor is not as accurate with the use of circuit 120 as obtainable through the use of circuit 30 in FIG. 2, a close approximation of the results is obtained while substantial savings result from the elimination of the log and antilog amplifiers. In FIG. 5 the circuitry up to rectifiers 58 and 60 is identical to that shown in FIG. 2. The ramp generating function is likewise identical to that shown and discussed in FIG. 2. The rectified output of the auxiliary winding is electrically connected to an inverting, adjustable gain amplifier 122 which has a resulting output of $-A\,V_A$. The output of rectifier 60 is connected to an adjustable gain amplifier 124 and therefore has an output of $B\,V_M$. The outputs of amplifiers 122 and 124 are combined through a summing amplifier 126 by electrical connection to the inputs thereof through resistors 128 and 130, respectively.

Summing amplifier 126 has an output which is approximately equivalent to the error signal e (output of amplifier 90 in FIG. 2). The output of amplifier 126 is combined with the output R of ramp generator 96 at summing amplifier 98 and thereafter combined with the threshold T reference voltage 100 at comparator amplifier 102. The output of comparator amplifier 102 is protected through diode 104 and delivered as a control signal to gate 34 of the triac.

In either control circuit 30 or 120, shown in FIGS. 2 or 5, respectively, the resultant ramp function signal is compared with threshold voltage 100 to obtain the firing level of triac 32. At any instant which the ramp signal R is larger than the threshold voltage T, triac 32 is forced into a conducting state by gate 34 and AC voltage appears across main winding 12 of the motor. When the motor load decreases, the ramp signal is lowered toward the base line due to the decrease in error signal. The length of time during which triac 32 is in a conducting state decreases and therefore the voltage to the motor likewise decreases. Correspondingly, an increase in motor load results in the conducting time for triac 32 to increase, thus increasing the voltage to the motor winding. It should be noted that in actual practice, triac 32 may be located in either input 16 or 18 without affecting operation of the circuit.

While considerable emphasis has been placed herein on preferred embodiments of the invention and the specific structures and structural interrelationships of the component parts thereof, it will be readily apparent that many embodiments of the invention can be made, and that many changes can be made in the embodiments herein illustrated and described without departing from the principles of the invention. Accordingly, it is to be distinctly understood that the foregoing descriptive matter is to be interpreted merely as illustrative of the invention and not as a limitation.

What is claimed is:

1. A motor circuit comprising in combination, a single phase motor having a main winding and a starting winding, a pair of input terminals, said main winding and said starting winding connected to said input terminals, and capacitor means connected in electrical series with said starting winding to said input terminals;

switching means in electrical series with one of said main and starting windings for controlling electrical power directed thereto, said switching means having an actuation terminal; and control means for providing a signal to said actuation terminal of said switching means, said control means including first sensor means for providing a first signal proportional to a voltage applied to said starting winding, second sensor means for providing a second signal proportional to a voltage applied to said main winding, said control means combining said first and second signals to provide said signal to said actuation terminal upon the occurrence of a predetermined combination of first and second signals.

2. The motor circuit according to claim 1 wherein switch means is connected in electrical series with said capacitor means and said starting winding for disconnecting said starting winding from said input terminals after start-up of said motor.

3. The motor circuit according to claim 1 wherein said control means includes first and second amplifier means for independently conditioning said first and second signals prior to combining said signals.

4. The motor circuit according to claim 3 wherein said first and second amplifier means provide output signals which are related to the natural logarithm of an input signal thereof.

5. The motor circuit according to claim 3 or 4 wherein one of said first and second amplifiers includes inverting amplifier means for inverting an input signal thereof.

6. The motor circuit according to claim 5 wherein said control means combines said first and second signals after operation of said amplifier means by a summing means for adding output signals of said amplifier means.

7. The motor circuit according to claim 1 wherein each of said first and second sensor means includes voltage dividing means for producing an alternating current output signal proportional to the voltage across the winding and rectifier means for converting the alternating current output signal to a direct current signal.

8. The motor circuit according to claim 6 wherein said control means further includes threshold means for conditioning an output signal of said summing means to provide an output signal at selected times in dependence on said first and second signals for use by the actuation terminal.

9. A control circuit for a single phase motor having a main winding and an auxiliary winding, the control circuit comprising:
switching means in electrical series with one of said windings for controlling power applied to said winding, first sensing means for producing a first signal proportional to a voltage applied to said auxiliary winding, second sensing means for producing a second signal proportional to a voltage applied to said main winding, and circuit means for actuating said switching means, said circuit means combining said first and second signals to actuate said switching means upon the occurrence of a predetermined combination of said signals.

10. The control circuit according to claim 9 wherein said switching means is in electrical series connection with said auxiliary winding.

11. The control circuit according to claim 9 wherein said switching means is in electrical series connection with said main winding.

12. The control circuit according to claim 10 or 11 wherein said circuit means includes first and second amplifier means for independently conditioning said first and second signals.

13. The control circuit according to claim 12 wherein said circuit means includes summing means for adding output signals of said first and second amplifiers.

14. A method of controlling a single phase motor having a main winding and an auxiliary winding to reduce power supplied to at least one of said windings when the motor is operating at less than full load, the method comprising the following steps:
connecting switching means in electrical series with at least one of said windings for controlling power applied to said one winding, detecting a first signal proportional to a voltage applied to said auxiliary winding with a first sensor means, detecting a second signal proportional to a voltage applied to said main winding with a second sensor means, combining said first and second signals through a control means to produce an actuation signal upon the occurrence of a predetermined combination of first and second signals, and energizing said switching means with said actuation signal to control power applied to said motor.

15. The method according to claim 14 wherein combining said first and second signals further comprises: independently providing a signal proportional to natural logarithm of said first and second signals through use of first and second amplifier means, inverting one of said first and second signals through use of an inverter means, adding output signals of said first and second amplifiers, and providing the natural antilogarithm of the added output signals of said first and second amplifiers through use of a third amplifier.

16. The method according to claim 15 further including applying an output signal of said third amplifier to a threshold means having additional inputs of a predetermined constant value signal and a cyclical ramp function signal, providing an output signal of said threshold means as said actuation signal.

* * * * *